United States Patent [19]
Ilon

[11] 3,814,046

[45] June 4, 1974

[54] VEHICLE FOR USE ON LAND, IN WATER, ON ICE AND IN SNOW

[76] Inventor: Bengt Erland Ilon, Norr Malarstrand 76, 4 tr, 112 35 Stockholm, Sweden

[22] Filed: Sept. 27, 1972

[21] Appl. No.: 292,689

[30] Foreign Application Priority Data
Sept. 29, 1971 Sweden............................ 12347/71
Sept. 19, 1972 Sweden............................ 12099/72

[52] U.S. Cl................ 115/1 R, 305/34, 280/DIG. 7
[51] Int. Cl........................................... B62d 55/08
[58] Field of Search............ 244/100, 100 C, 100 A, 244/114; 205/34; 180/1 R, 9; 280/DIG. 7

[56] References Cited
UNITED STATES PATENTS

| | | | |
|---|---|---|---|
| R24,272 | 2/1957 | Albee............................ | 280/DIG. 7 |
| 2,923,578 | 2/1960 | Marsh................................ | 305/34 |
| 3,178,732 | 4/1965 | Stibitz.................................... | 5/81 |
| 3,272,172 | 9/1966 | Thomson............................ | 305/34 |
| 3,346,062 | 10/1967 | Richison....................... | 180/9.32 X |

*Primary Examiner*—Richard J. Johnson
*Attorney, Agent, or Firm*—Sughrue, Rothwell, Mion, Zinn & Macpeak

[57] ABSTRACT

A vehicle for use on land, in water, on ice and in snow, comprising a vehicle body supported by at least one expansible invaginated pillow-like container that is driven by means of a belt extending between the intermediate layers of the container and in the longitudinal direction of the same.

8 Claims, 12 Drawing Figures

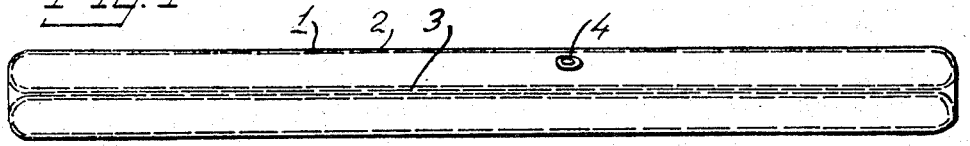
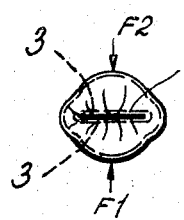
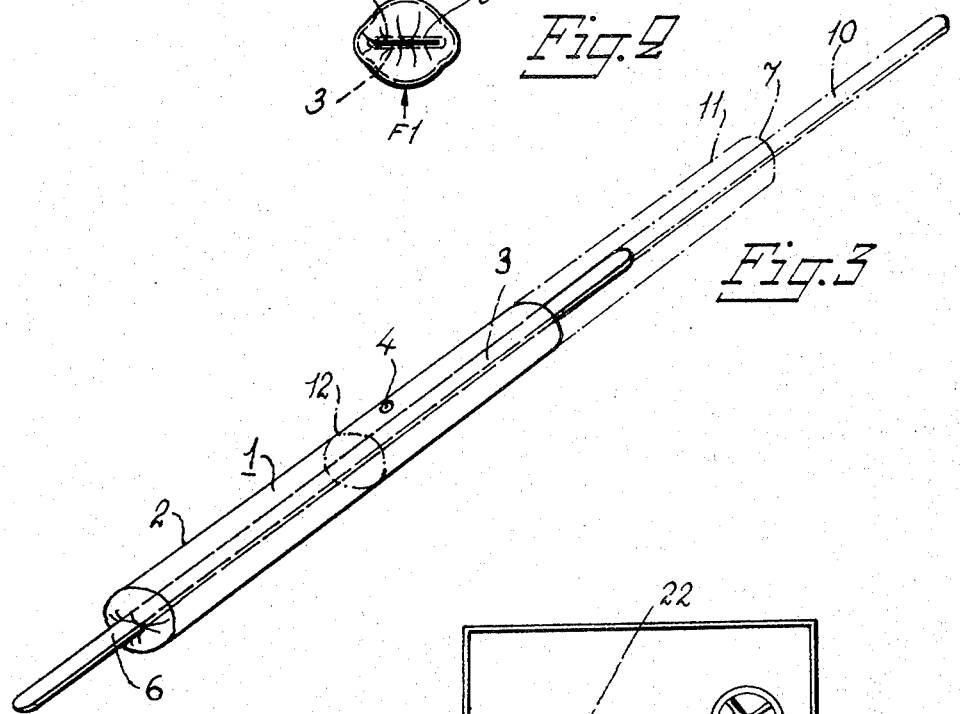
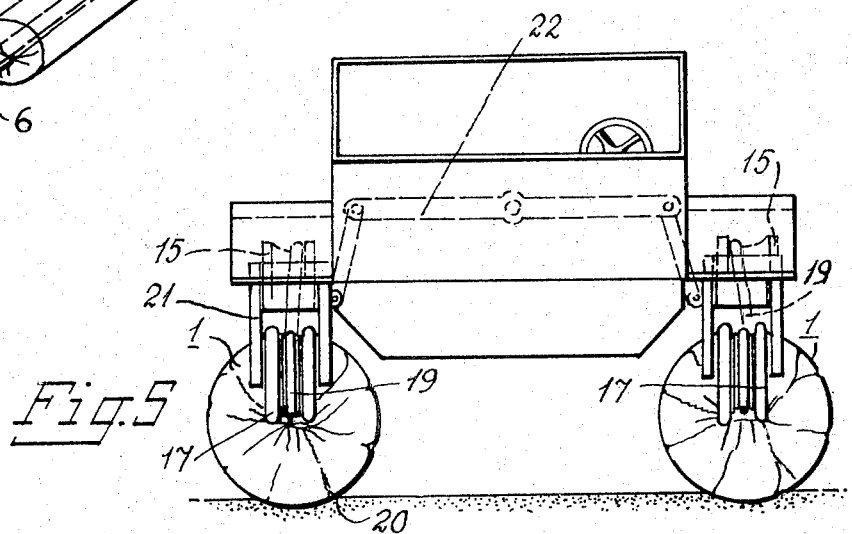

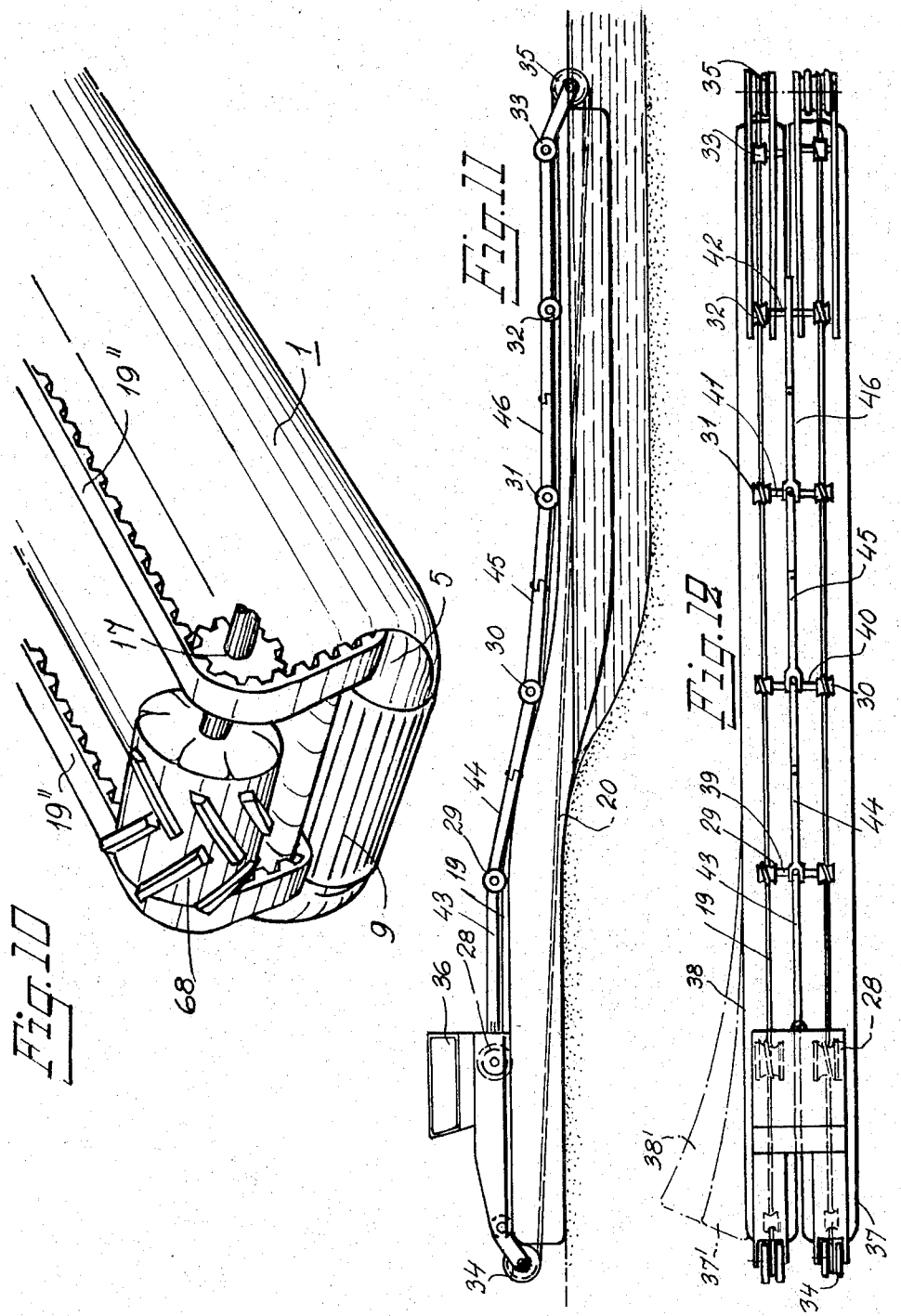

VEHICLE FOR USE ON LAND, IN WATER, ON ICE AND IN SNOW

BACKGROUND OF THE INVENTION.

Problems sometimes arise in connection with propelling vehicles, particularly elongated and heavy ones, over uneven terrain and over snow, ice and water. In order to carry for one example people or for another example oil or the like, it may be inappropriate or even impossible to use an ordinary wheel-supported or endless track supported vehicle under some circumstances.

SUMMARY OF THE INVENTION.

This invention refers to a vehicle that is intended for use on land, in water, on ice and in snow, said vehicle comprising one or more propagating, expansible pillow-like containers as supporting elements.

The object of the invention is to provide a vehicle having a new type of supporting element which makes possible an extremely simple solution of the above-indicated problems, and this is achieved by the vehicle being supported by at least one expansible invaginated container having an outer layer and two intermediate layers engaging each other, wherein said vehicle is adapted to be propelled by a frictional member being introduced between said two intermediate layers at one end of the container and being displaced in the direction of the other end of the container, said vehicle thereby being made to travel in the direction in which said frictional member is introduced.

BRIEF DESCRIPTION OF THE DRAWINGS.

The invention will be described specifically below with reference to the accompanying drawings, in which FIG. 1 shows a lateral view of a supporting element in the form of a so-called invaginated container which is utilized in practicing the instant invention, FIG. 2 is a front view of the container of FIG. 1, FIG. 3 illustrates the container of FIG. 1 penetrated by a rod for illustrating the mode of operation of said supporting element, FIG. 5 is a front view of the vehicle of FIG. 4, FIG. 10 is a perspective view of the front portion of an inflated container serving as the sole supporting element of a vehicle of the invention, said container being propelled by two comparatively narrow belts located on opposite sides of the vehicle and making contact with the material on which the vehicle runs by means of a wider central belt, with a free-running climbing roller in accordance with the invention being illustrated, FIG. 11 is a lateral view of a vehicle designed in accordance with the principles of the invention, said vehicle being intended for conveying for example oil over long distances, and FIG. 12 is a plan view of the vehicle of FIG. 11. Identical designations have been used in the various figures whereever possible.

Figure 4:
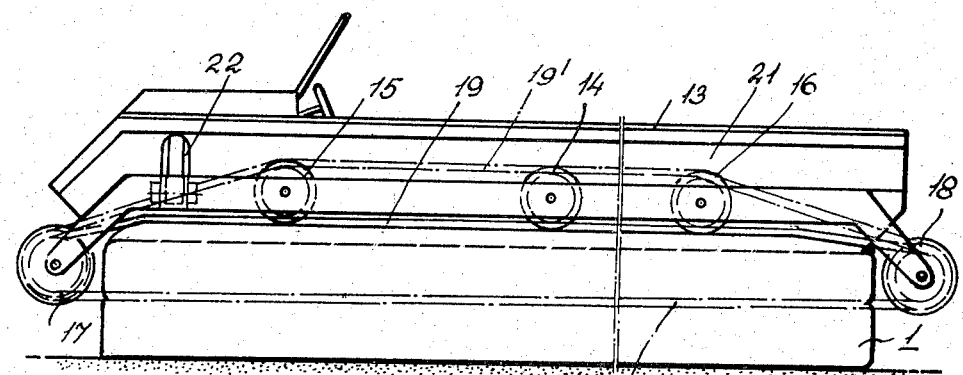
FIG. 4 is a lateral view of a vehicle according to the invention provided with a supporting element of the type illustrated in FIG. 1.

DESCRIPTION OF THE PREFERRED EMBODIMENTS.

The basic element utilized for providing a vehicle in accordance with this invention is a so-called invaginated container, which generally speaking is an elongated tube, one end of which has been drawn into said tube, whereafter the free ends of the tube have been bonded to each other, for instance by vulcanizing (with rubber tubes) or by welding (with plastic tubes). The container thus formed is provided with a valve by means of which it may be inflated.

A container of the type described above is designated 1 in FIG. 1. The outer layer of the container is designated 2, and its two central layers are designated 3. The designation 4 refers to a valve that is attached to the tube. The body portion of said valve may be depressed into the container 1 after the latter has been inflated, so that the part of the valve located on the surface of the container will lie substantially on the same level as this surface. FIG. 2 shows the invaginated container as viewed from in front, wherein it is assumed that the container is subjected to a force F1 from below and to a force F2 from above, so that the opening 5 between the two portions of the central layer 3, in other words the opening at the location where the tube forming the container "goes into itself," will be of elongated shape in the transverse direction. The container may either be produced in the manner mentioned above, i.e., by one end of a tube being drawn into the tube and the tube being closed by the two free ends of the tube being bonded together, or else an external tube having open ends may be drawn over the outside of an internal tube, which also has open ends, whereafter those ends of the external and internal tube, respectively, which correspond to each other are bonded together.

The mode of operation of the container is illustrated in FIG. 3. If a ruler-like rod 6 is introduced from one end of the container between those surfaces of the respective central layer portions of the container which engage each other, the central portions 3 of said container will propagate out at the other end of the container and will move radially towards the circumference of the container, thereby extending the external layer 2, on the condition that the friction between the rod and each of the surfaces engaging it is great enough, said external layer being reduced correspondingly at said one end of the container, said container thereby resembling an expanded sausage that propagates forward in the direction in which the ruler-like rod 6 is introduced.

The outline illustrated in dot-dash lines 10 in FIG. 3 shows the rod 6 in the position that it may be assumed to take when beginning to be introduced into container 1, said container originally taking the position illustrated by dot-dash lines 11 with one of its ends at 7 and with its other end at 12. When the rod 6 has been pushed all the way through the container it will be in the position illustrated by solid lines in FIG. 3, and the container 1 will then have travelled forward so as to be located in the position illustrated by solid lines.

In accordance with the basic concept of the invention, the above-described container is utilized as a supporting element for a vehicle, with FIGS. 4 and 5 showing a lateral view and a front view, respectively, of a vehicle that has been selected as an example and that can be propelled on land, in water, on ice and in snow by two propagating containers being utilized as an engagement surface against the supporting matter, in other words the ground, water, ice or snow. In FIG. 4 the designation 13 refers to the vehicle chassis, which is provided with wheels 14–18 corresponding to each other in pairs on opposite sides of the vehicle. Specific wheels, for example 14, may be propelling wheels, whereas others, for instance 15–18, may be free-running wheels. Alternatively, it may be appropriate to let the front wheel, in this case 17, and/or the rear wheel, in this case 18, serve as the propelling wheel. The propelling wheels may to advantage be provided with engagement teeth, and this also refers to the propelling belts. In this fashion it becomes possible to eliminate any displacement of the wheel suspension frame with respect to the propelling containers that engage the supporting matter. Moreover, said containers may also be provided with teeth for better engagement with the supporting matter.

The vehicle may be powered in conventional manner, for example by means of one or more motor having an appropriate transmission and powering appropriately selected wheels. Hence, as has been mentioned above, naturally some other pair of wheels than the pair of wheels 14 located on opposite sides of the vehicle or several pairs of wheels may serve as the powered wheels. As illustrated in FIG. 4, the respective pairs of wheels 14–18 are mounted in suspension arms 21 of a type known per se. Appropriate surfaces on each of the pairs of wheels 14, 15 and 16 engage invaginated containers 1 being located on opposite sides of the chassis 13 and having sufficient dimensions. Also, an endless wire or an endless belt 19 extends around wheel 17, furthermore in between the central layers 20 of the invaginated container, around wheel 18, and in a loop around each of the wheels 16, 14 and 15. Alternatively, the belt may run on the top side of the pairs of wheels 14, 15 and 16 in the path illustrated by the dot-dash line 19' in FIG. 4. It is not necessary for the belt to extend in a loop around these pairs of wheels, and the belt may simply be tensioned to engagement against the upper side or lower side, respectively, of the individual wheels. The belt may to advantage be provided with recesses and projections, respectively, for cooperating with toothed elements on the wheels 14–18. The wire or belt 19 should have substantial friction with respect to the central layers 20 of said container so that the containers 1 located on opposite sides of the vehicle chassis and supporting the same will be advanced. It may be appropriate to arrange for toothed engagement here as well, in this case between the propelling belt 19 and the container 1.

The suspension arms 21 may be disposed in a yoke arrangement 22 in a manner known per se, which makes it possible to achieve a vertical movement of the vehicle chassis that is only half of the magnitude of the vertical movement of the two propelled containers. The vehicle of FIGS. 4 and 5 may appropriately be steered by the individual containers being propelled at different speeds.

Figure 6:
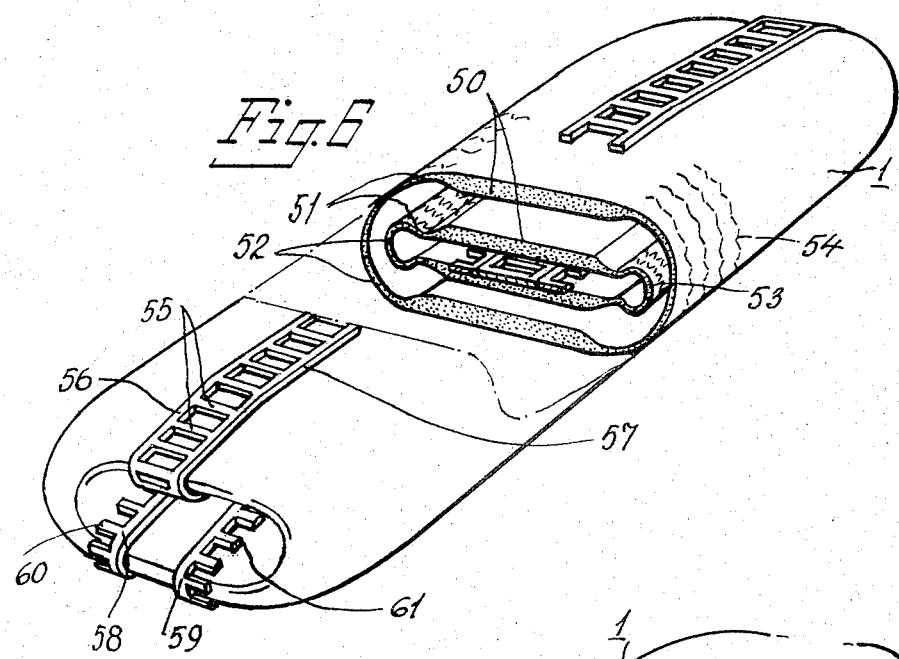
FIG. 6 shows an example of a supporting element for a vehicle in accordance with the invention with a cross-section illustrating a specific type of reinforcement.
Figure 7:
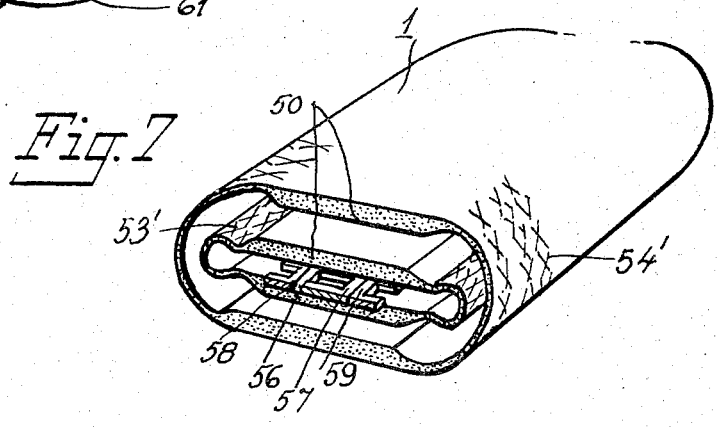
FIG. 7 shows a cross-section as in FIG. 6 with another type of reinforcement, FIG. 8 diagramatically shows a vehicle in accordance with the invention having four propelling motors and two supporting elements.

However, it is not always possible to utilize any desired tube having one end drawn into itself as a container which serves as a propagative supporting means for the vehicle of FIGS. 4 and 5. The container may have to be reinforced with suitable material for making its lateral surfaces more rigid, for example rubber belts or steel wires. This is illustrated in FIG. 6, which shows that the central portion 50 of the container consists of thicker material that thins out towards the sides at 51 and continues around in the curved portion 52 having substantially the same thickness as the portion 51. The portions 51, 52 may to advantage be strengthened by means of reinforcing, with one type of reinforcement means being illustrated in FIG. 6 and being designated 53 there in unextended state end being designated 54 in extended state. FIG. 7 illustrates another type of reinforcement means which is designated 53' in unextended state and 54' in extended state.

Figure 8:
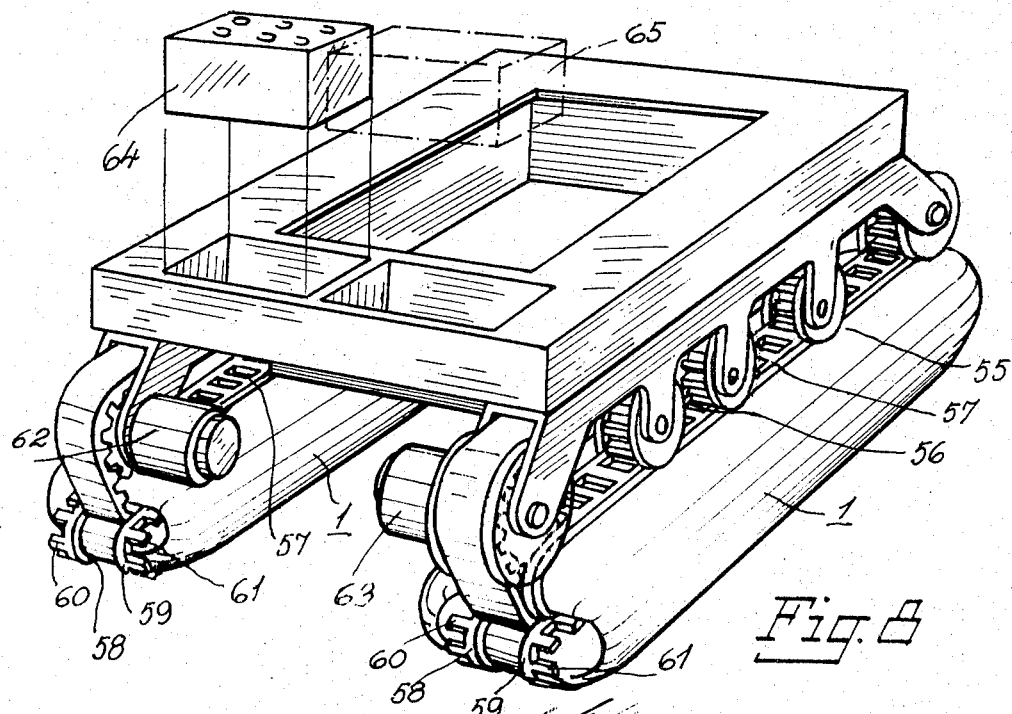

FIG. 6 also illustrates teeth 55 for engaging corresponding teeth on the wheels located at the upper side of the container as illustrated in FIG. 8, wherein a substantial number of teeth are provided, with said teeth 55 also being provided with elongated lateral ribs 56 and 57, respectively, extending in the longitudinal direction of the container. The combination of teeth 55 and lateral ribs 56 and 57, respectively, is intended to engage elongated lateral ribs 58 and 59, respectively, which are located in the lower portion of the container, the latter lateral ribs in turn being reinforced by means of transverse projections 60 and 61, respectively, which also serve the purpose of increasing the propulsive engagement with the supporting matter. In this respect, compare also FIG. 8, in which the two foremost powering motors are designated 62 and 63, respectively, (the two rear powering motors are not visible) and in which the upper portion of the vehicle is illustrated with an unfurnished seat recess and is provided with space for propulsion accumulators 64 and 65, respectively.

Figure 9:
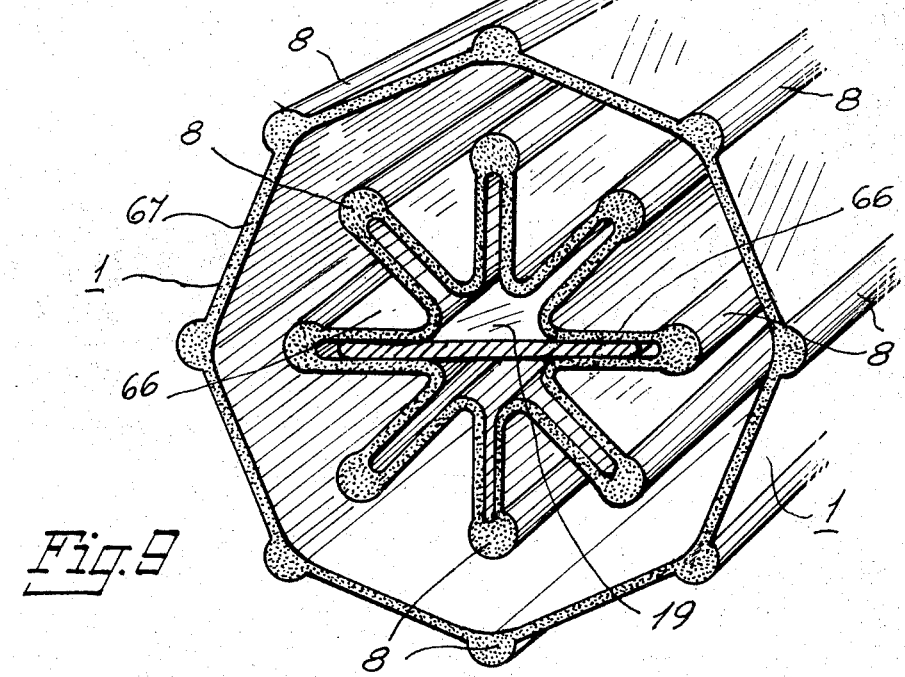
FIG. 9 shows a cross-sectioned perspective view of an inflated container serving as a supporting element for a vehicle in accordance with the invention, said container being provided with elongated ribs to provide rigidness so that the supporting element will not become unstable laterally when its internal portion moves outwards and forms the external or outer portion.

It may be appropriate to design the supporting container or supporting element in the fashion illustrated in FIG. 9, wherein the internal configuration 66 illustrates the walls of the supporting element in unextended state and the external configuration 67 illustrates the walls of the supporting element in extended state. The supporting element is provided with longitudinal reinforcing ribs 8 so as to prevent it from being displaced laterally. For example, this measure may be appropriate if a vehicle equipped with the pertinent type of supporting element is subjected to a laterally directed force. The designation 19 in FIG. 9 refers to the propelling belt.

The vehicle in accordance with the invention may also be designed with a plurality of propelling belts. Viewed from in front, these belts may be disposed in the manner illustrated in FIG. 10, wherein narrow propelling belts 19" extend along each of the longitudinal sides of the vehicle and for instance engage pairs of wheels similar to the pairs of wheels 14–18 in FIG. 4. A belt comprising a portion of the container 9 and having considerable width engages the supporting matter, for example the ground, and is located between the belts 19". The container belt may be provided with a suitable wear surface as indicated in FIG. 10. By means of this structure it becomes possible to achieve a low ground engagement force per surface unit of the container belt, which may be of particular advantage in propulsion on a soft base material. The designation 1 in FIG. 10 refers to the container wall, and 5 is the central opening of the container.

At the front and/or at the rear the vehicle may be provided with one or more free-running climbing rollers 68 of the type illustrated in FIG. 10, preferably located at the front of the vehicle, whereby said vehicle can move in terrain with vertical irregularities with great ease. Naturally, said irregularities must not be too great as compared to the dimensions of the vehicle. Under certain circumstances it may be suitable to mount the climbing roller further in front in the longitudinal direction of the vehicle that is illustrated in FIG. 10.

Another type of vehicle is illustrated in FIGS. 11 and 12, respectively, wherein one or more propelled containers may be used for conveying for example oil over long distances, irregular terrain, and water, snow and/or ice. In this example two elongated containers serve as supporting elements, with each of said containers utilizing a wire or a belt 19 which may be propelled by a pair of powered wheels 28. Said belt extends around free-running wheels 29-33 and around end wheels 34 and 35, respectively, which to advantage may be provided with teeth as is also the case with the inside of the belt. The belt continues along the upper side of the container and is thereafter introduced between its central layers 20 so as to propel each container as the result of frictional engagement. The designation 36 refers to a control cabin from which the vehicle may be steered by increasing the speed of one of the containers, namely 37 in FIG. 12, with respect to the other one, in other words 38 in FIG. 12, in a curve so as to achieve the turn by the respective containers following the paths illustrated by the dot-dash lines 37' and 38' in FIG. 12. The two containers 37 and 38 may be retained closely adjacent each other by means of appropriate connection shafts 39-42 and intermediate links 43-44 that are known per se.

In the embodiments of FIGS. 4, 5 and 11, 12, respectively, it may be suitable to duplicate the container walls and to utilize an external tube having a substantially constant radius and a heavy-duty wear layer, such as reinforced rubber without the capability of being extended but not entirely rigid, and an internal tube having good expansive qualities and consisting of for example latex. It is also possible to utilize a plurality of layers.

The explanation of the fact that it is possible to propel vehicles in accordance with the embodiments disclosed above in water lies in the friction between the containers and the wet surface, naturally in addition to the floating capability that is achieved as the result of the container design. With regard to propelling in terrain, the vehicle passes all irregularities there in an excellent fashion as the result of the container design.

The invention is not restricted to the embodiments described above and illustrated in the drawings, and these are only intended as examples of the invention and its utilization.

I claim:

1. A vehicle for use on land, in water, on ice and in snow, comprising at least one expansible invaginated container having (a) an external layer and (b) two central layers engaging each other, and friction means introduced between said two central layers at one end of the container, said friction means being displaceable in the direction of the other end of said container for propelling the vehicle in the direction of introduction of said friction means, said container having a wide wear surface, and said friction means comprising two narrower belts located on opposite sides of said wear surface.

2. A vehicle in accordance with claim 1, wherein said belts are endless.

3. A vehicle in accordance with claim 1, wherein said container is composed of a material having wear surfaces of substantial rigidity and resilient lateral surfaces.

4. A vehicle in accordance with claim 1, wherein said container is expanded by means of an introduced gaseous medium.

5. A vehicle in accordance with claim 1, wherein said container is expanded by means of an introduced liquid medium.

6. A vehicle in accordance with claim 1, wherein the lateral surfaces of said container are reinforced so as to be resilient only to a predetermined extent.

7. A vehicle in accordance with claim 1, wherein the container is provided with elongated ribs.

8. A vehicle in accordance with claim 1, wherein said vehicle is provided with at least one free-running climbing roller.

* * * * *